Aug. 18, 1959  P. A. SALENGRO  2,899,934
POWER-DRIVEN TOOLS
Filed Jan. 2, 1957  4 Sheets-Sheet 1

Inventor
Paul A. Salengro
by
Stevens, Davis, Miller & Mosher
his attorneys

Aug. 18, 1959 P. A. SALENGRO 2,899,934
POWER-DRIVEN TOOLS

Filed Jan. 2, 1957 4 Sheets-Sheet 2

Inventor
Paul A. Salengro
by
Stevens, Davis, Miller & Mosher
his attorneys

Aug. 18, 1959   P. A. SALENGRO   2,899,934
POWER-DRIVEN TOOLS
Filed Jan. 2, 1957   4 Sheets-Sheet 4

United States Patent Office
2,899,934
Patented Aug. 18, 1959

2,899,934
POWER-DRIVEN TOOLS
Paul A. Salengro, Antony, France
Application January 2, 1957, Serial No. 632,189
Claims priority, application France January 19, 1956
12 Claims. (Cl. 121—13)

In his previous Patent No. 2,762,341, the applicant has described a power-driven tool, and in particular a pneumatic tool, in which the body of the tool or the motor element can slide in a kind of casing or guide which carries the operating handle. The damping of the vibrations of the motor element is ensured by the interposition, between the casing and the said element, of a variable volume of air which is connected without any substantial loss of pressure to the source of compressed air. In the case of a pneumatic tool, the air is led to the mechanism of the motor element by a calibrated tube which connects this mechanism to the interior of the chamber containing the volume of air referred to above, and various means are provided, on the one hand to ensure the fluid-tightness of the sliding action of this calibrated tube, irrespective of the amount of play which may have been produced between the various parts of the tool and, on the other hand, in order to ensure the control of the passage of compressed air through the said tube.

The present invention has for its object improvements in power-driven tools of the kind referred to above, and more particularly in pneumatic tools.

One of these improvements resides in the combination with the damping device by means of compressed air, of an elastic device which acts in both directions of relative displacement of the motor element and the casing.

This combination especially enables a variable rigidity to be obtained in operation, and in addition, it ensures a better damping or absorption of shocks which may be produced at the end of the stroke of the motor element.

A further improvement relates to a particular arrangement of the calibrated tube which connects the compressed air chamber to the mechanism of the motor element, with a view to ensuring a variable control of the admission of air to the said mechanism as a function of the force applied by the operator on the handle.

Further improvements will be brought out from the description which follows below, reference being made to the accompanying drawings (which are given by way of example only and not in any sense by way of limitation) and which will make it quite clear how the invention may be carried into effect, the special features which are brought out, either in the drawings or in the text, being understood to form a part of the said invention.

Figure 1:
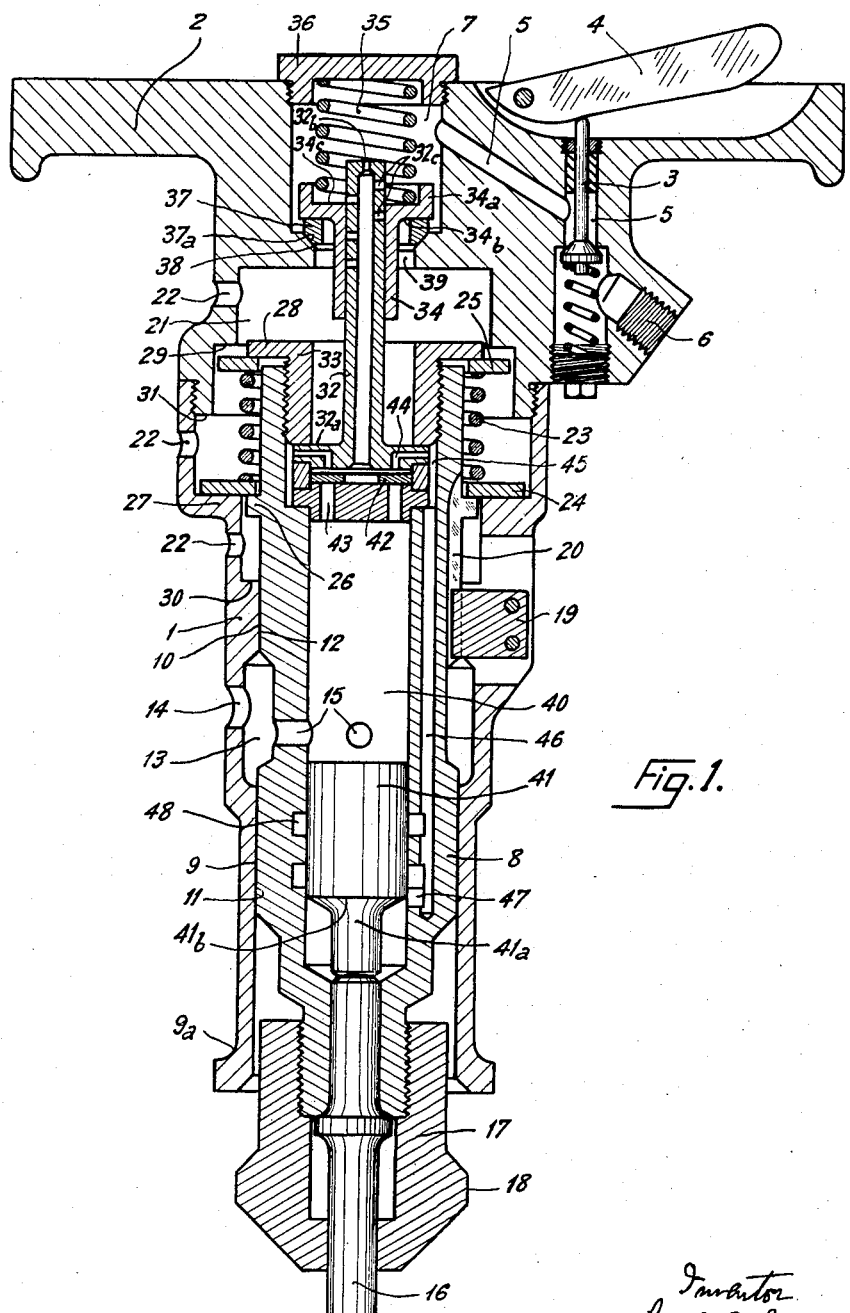
Fig. 1 is a diagrammatic view in longitudinal cross-section of a pneumatic tool such as a drilling hammer constructed in accordance with the invention.

In the form of construction shown in Fig. 1, the pneumatic tool comprises a guiding member or casing 1 which terminates at its upper part in a handle 2 which is provided in the usual manner with a valve 3 controlled by a lever 4. The valve 3 enables the passage 5 to be opened or closed, this passage connecting the compressed air intake tube 6 to the chamber 7 formed inside the handle 2. The passage 5 is given fairly large dimensions in order to join the chamber 7 to the source of compressed air without substantial loss of pressure.

A motor element 8 is mounted inside the casing 1. It can slide on two cylindrical bearing surfaces 9 and 10 of the said casing, co-operating with corresponding bearing surfaces 11 and 12 formed on the motor element. Between these two pairs of bearing surfaces 9, 10 and 11, 12 is formed a space 13 which is connected to the atmosphere by means of ports 14, into which space discharge the exhaust ports 15 of the motor element 8.

The bearing surface 9 of the casing is preferably extended at 9a over a certain distance so as to constitute a supplementary manual grip for the tool.

At its lower part, the tool terminates in an end portion 16 (pick or drill-bit) in the usual way; this end member is retained on the motor element by means of a screwed sleeve 17 which is preferably provided with a thickened portion 18 which is intended to free the material better in order to facilitate the penetration of the tool into the material.

A stud or small key 19 co-operating with a groove 20 formed in the motor element may be provided in the body of the casing in order to prevent the motor element from rotating with respect to the casing. This arrangement also facilitates dismantling, for example by enabling one of the two elements (motor and casing) to be clamped in a vice without the other being able to rotate.

The internal portion of the casing 1 on the other side of the bearing surface 10 forms a chamber 21, in which the upper portion of the motor element can move. This chamber is connected to the atmosphere by means of ports 22 formed at various points.

Around the upper part of the motor element is wound a spring 23 which is held between two rings 24 and 25. This spring can be compressed during assembly, or it may be in its natural state between the two rings, when no force is applied to the apparatus. The ring 24 can abut either against a flange 26 provided on the motor element, or against a shoulder 27 formed in the chamber 21, depending on the relative position occupied by the motor element and the casing. The ring 25 can abut in the same way either against a flange 28 on the motor element or against a shoulder 29 on the casing.

In addition to this, abutments or stop members are provided on the one hand at 30 at the end of the bearing surface 10 for the flange 26, and on the other hand at 31 for the ring 24 in its movement towards the bottom of the casing. The abutment 31 is preferably formed by the collar of the member which constitutes the handle 2.

The motor mechanism of the tool is connected to the chamber 7 by means of a calibrated tube 32 preferably held in position by a threaded ring 33 which also forms the flange 28.

The tube 32 passes through the wall which closes the chamber 7 through the medium of a device which enables the fluid tightness of the sliding action of this tube to be obtained, whatever position the tube may take with respect to the casing. This sealing device may be of any desired type, with an elastic or sliding mounting, described in the previous patent of the present applicant referred to above. In the present example, it comprises a sleeve 34 mounted with an easy friction on the tube 32 and comprising a flange 34a, the lower face 34b of which is flat, whilst the upper face 34c is provided with centering means for the extremity of a spring 35 which is held in place by a plug 36 which closes the chamber 7. The flange 34a is supported by a ring 37 which is supported in its turn by a spherical bearing surface 37a on a circular seating 38, having the shape of a surface of revolution for example a conical shape, provided in the partition which separates the chamber 7 from the chamber 21. This partition is, in addition, pierced with an opening 39 having a diameter greater than that of the sleeve 34.

Figure 3:
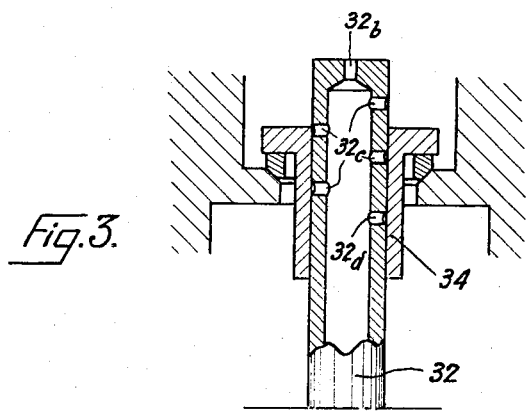
Fig. 3 is a partial view in cross-section showing the arrangement of the supply tube.

The tube 32 is closed at its upper end, in which is formed an opening 32b. In its lateral walls, it has a certain number of further openings 32c, and below these openings, a lateral opening 32d. These various openings are shown to a larger scale in Fig. 3, and their purpose will be explained later.

The motor element comprises in the ordinary way a cylindrical chamber 40, in which is arranged to move the piston 41, the latter being terminated by a nose 41a with which it strikes the pick 16.

The head of the motor element under the tube 32 comprises an annular valve 42 which can open or close channels 43 leading directly to the cylinder 40, or channels 44 formed in the base 32a of the tube 32, and terminating in an annular space 45 which communicates by means of a longitudinal channel 46 with a port 47 located at the lower part of the cylinder 40. Above the port 47 grooves 48 are provided in the wall of the cylinder 40, these grooves communicating with each other and with the port 47, for example by means of the channel 46.

The operation of the pneumatic tool which has just been described is as follows:

The motor element operates in the usual manner. Assuming that the various members are in the position shown in the drawing, the piston 41 rests on the head of the pick and the portion of the cylinder 40 which is located above the piston communicates with the atmosphere through the medium of the ports 15 and 14. The valve 42 closes the channels 43.

If now the lever 4 is operated, compressed air passes into the chamber 7, penetrates into the tube 32, passes through the channels 44 and arrives under the lower face of the piston 41 through the channel 46 and the port 47. The piston 41 moves upwards, and when it has uncovered the port 15, the compressed air which acted on its lower face passes out to the atmosphere.

During this time, the air enclosed in the upper part of the cylinder 40 is subjected to compression by the piston 41 and lifts the valve 42. The compressed air then passes through the central opening of the annular valve 42, and then through the channels 43 and pushes the piston downwards; as it descends, the piston uncovers the port 15 which puts the upper part of the cylinder 40 into communication with the atmosphere and compresses the air located below the ports 15. The valve 42 is again applied to close the channels 43, and the cycle is repeated as long as the lever 4 is actuated.

This operation will increase in rapidity as a larger number of orifices 32b and 32c of the calibrated tube 32 are uncovered by the sleeve 34.

The grooves 48 are arranged so as to be closed by the piston when the latter arrives at the end of its stroke, in order that the edge 41b of the lower face of the piston will no longer have to pass over said grooves if the piston continues to move downwards after having struck the head of the pick. The grooves are especially intended to provide an optimum volume of air under the piston during the downward movement of this latter, in order to control the valve 42 which enables only a single conduit 46 of small diameter to be employed, and in consequence the thickness of the walls of the motor element may be reduced while simplifying the machining of this element and enabling it conveniently to retain a shape of revolution at the bearing surfaces 11 and 12; in addition, the body of the motor element may be kept short and of small diameter, so that it is light. This assumes a special importance in the case of tools constructed in accordance with the present invention, or in accordance with the patent referred to above, on the contrary to what takes place in the case of monobloc tools of usual type in which these problems of shape and bulk practically do not arise. By providing a number of grooves, a better rigidity of the cylinder is also ensured for a given volume of grooves, and the guiding of the piston is thereby improved.

In order to be able to explain with greater clearness the operation of the combined damping device of the tool, it would appear desirable to study first of all how the sliding action of the motor element in the casing is effected, assuming that these two members are displaced without causing operation of the mechanism of the motor element.

It will be assumed that in the first place, the valve 3 being closed, the various members are in the positions shown in Fig. 1. The ring 24 is resting on the shoulder 27 and the spring 23 presses the ring 25 against the flange 28. In addition, the ring 24 is pressed against the flange 26, and a free space exists between the ring 25 and the stop member 29.

If pressure is applied to the handle 2, always without opening the valve 3, the motor element being for example held fixed, the casing will first of all move freely downward until the stop member 29 comes into contact with the ring 25. The casing will then act on the ring 25 and compress the spring 23, the motor element remaining applied by the flange 26 under the ring 24. This compression will continue until the stop member 31 comes into contact with the ring 24.

When the pressure on the handle is released, the spring will progressively expand until the various members return again to their original positions. If at this moment a pull is applied to the handle, the casing will move the ring 24 to compress the spring 23 and will slide with respect to the motor element until the abutment 30 comes into contact with the underside of the flange 26.

The abutments 24–31 and 26–30 are provided in such manner as to prevent any crushing of the turns of the spring 23 under the effect of extreme forces in tension or compression.

As soon as the compressed air is admitted to the apparatus, the pressure acting on the tube 32 pushes the motor element out of the casing and compresses the spring 23. In addition, the motor element begins to vibrate longitudinally under the action of its mechanism.

The spring 23 damps these vibrations which would otherwise be directly transmitted to the casing by the apparatus which has come into abutment with the casing. In addition, the tube 32 has returned inside the sleeve 34 and the motor mechanism, being only supplied through the orifice 32b and perhaps through one of the orifices 32c, is idling.

When the operator presses down on the machine, the motor element moves upwards inside the casing, thus relieving the force acting on the spring 23, which continues to contribute to the damping of the vibrations with the air cushion of the chamber 7. The motor element thus oscillates inside the casing about a mean position which will depend on the force applied by the operator on the handle. The harder the operator presses, the closer this position becomes to the bottom of the casing and the more the upper extremity of the tube 32 will project out of the sleeve 34.

At the same time, the number of the orifices 32c which are uncovered increases, and with this, the power developed by the motor element. There is thus obtained a power consumption which varies with the force applied.

On the other hand, it is necessary to space apart the orifices 32c in order to obtain a sure and progressive control and a good efficiency, taking account of the amplitude of the vibrations of the motor element. The distance over which these orifices are formed is thus fairly great, and this is what produces the advantage of the variable rigidity of the apparatus, conferred by the dead period due to the space formed between the ring 25 and the shoulder 29, or between the ring 24 and the shoulder 27, depending on the relative positions of the casing and of the motor.

This rigidity may even be nil if the dead space is chosen so as to be greater than the amplitude of the vibrations of the motor element, since at this moment the vibrations of the motor element do not apply any repercussion on the handle through the medium of the spring 23. The rigidity increases in proportion as the force applied by the operator becomes greater, and thus as the mean positions of the ring 25 and the abutment 29 become closer together, since then the reactions of the spring 23 on the handle become more powerful. When the ring 25 and the stop member 29 are in permanent contact, the rate of flow of air from the motor mechanism is practically stable since the greater part of the orifices 32c are uncovered and, in view of the fact that the rigidity has reached its maximum value, the relative mean positions of the casing and the motor element vary very little with the applied force.

If the operator presses too hard on the tool, the ring 24 comes into contact with the stop member 31 and at that moment the operator feels the vibrations of the motor element and automatically relaxes his pressure on the tool.

If during the course of operation, for example in order to release a pick which is jammed in the material which is being broken up, the operator is led to pull on the handle, the reverse operation to what has been described takes place, and the casing moves upwards along the motor element to compress the spring, until the stop member 30 comes into contact with the flange 26, this only taking place in the case of an excessive pull being applied to the handle. Only the orifice 32b is then uncovered, and the consumption of air is small. At the end of the stroke, the orifice 32d passes out of the sleeve 34 and the compressed air escapes through the said orifice into the chamber 21 and from thence to the atmosphere, stopping or considerably slowing-down the working of the tool, and reducing in consequence the intensity of the vibrations at the moment when the sliding members of the machine are approaching their abutment members.

Figure 1A:
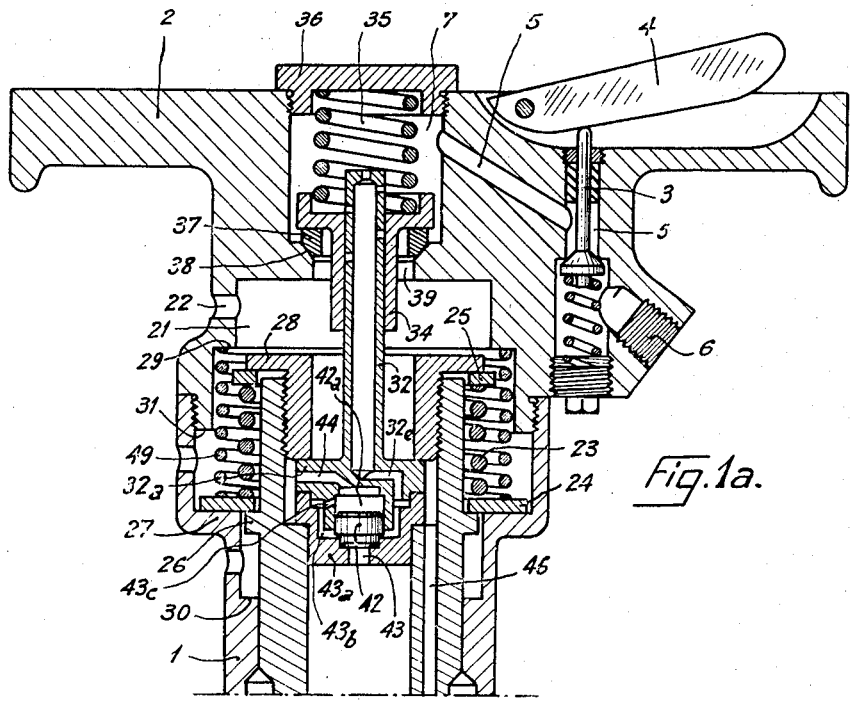
Fig. 1a is a partial view similar to that preceding and showing an alternative form of construction.

The alternative form shown in Fig. 1a differs from the form of embodiment which has just been described by the provision of a supplementary spring 49 interposed between the ring 24 and the stop member 29.

This spring acts alone at the beginning of the downward movement as long as the stop member 29 has not come into contact with the ring 25, and the rigidity of the tool is low. When these members 29 and 25 are in contact, its action is added to that of the double-acting spring 23. When the operator pulls on the handle, only the spring 23 is in action, the supplementary spring 49 remaining at rest. For the remainder of the cycle, the operation is the same as that which has already been described.

The base 32a of the tube 32 is given a slightly different shape in order to co-operate with a valve 42, formed by a solid body sliding in a fluid-tight manner inside its housing, this housing comprising two different bores formed in the members 43a and 32a.

This base portion 32a still comprises however the channel or channels 44 which lead to the channel 46 of the motor element. It defines, with the member 43a which is now provided with a central channel 43, an annular chamber 43b which communicates on the one hand with the housing 42a of the valve through the intermediary of a channel 43c and on the other hand, with the bore of the tube 32 by means of a channel 33e. The operation of this valve arrangement is the same as that which has been described in connection with Fig. 1, the same pressures acting on the valve in order to cause it to close either the channel 44 or the channel 43.

Figure 2:
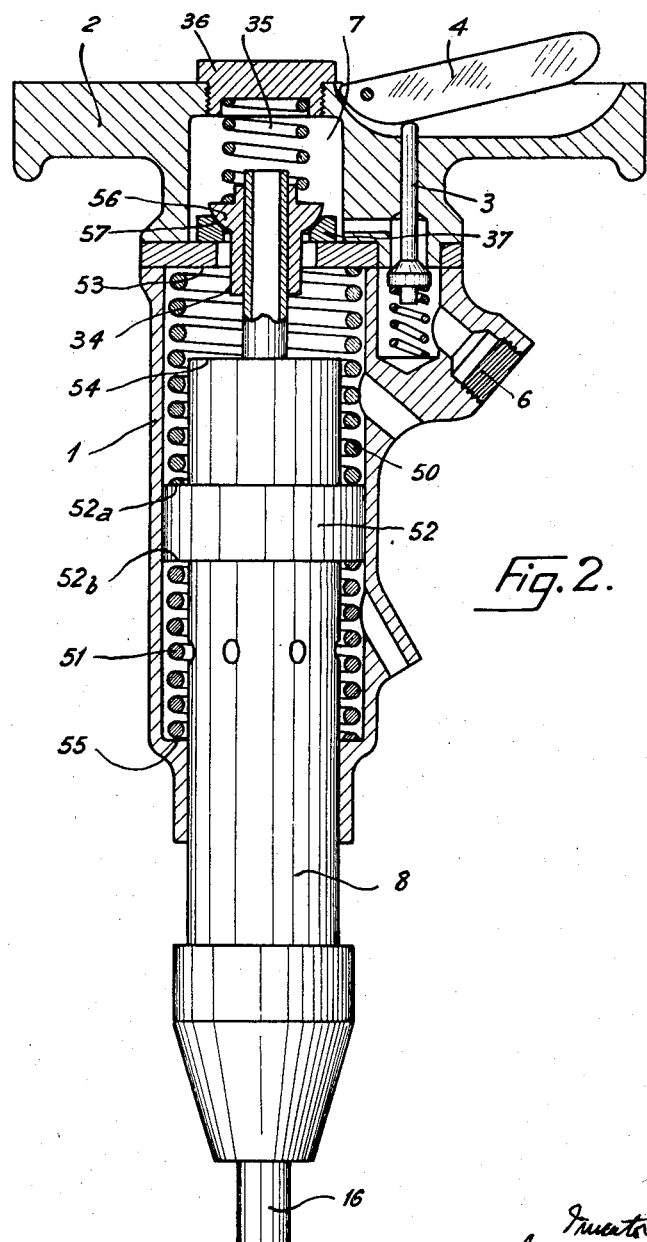
Fig. 2 is a diagrammatic view in longitudinal cross-section of a second alternative form of construction.

In the alternative form shown in Fig. 2, the double-acting elastic damping device is formed by two springs 50 and 51 arranged on each side of a central bearing surface 52 of the motor element 8.

The spring 50 is supported on the one hand against the upper face 52a of the bearing surface 52 and on the other hand against the base 53 of the casing 1. This base also serves as a stop member for the end face 54 of the motor element 8 in order to prevent crushing of the spring. The lower spring 51 is supported against the lower face 52b of the bearing surface 52 and against a seating 55 formed in the casing 1.

The two springs 50 and 51 are preferably compressed when assembled in position in such manner that when the operator presses down on the handle, the compression of one of the springs increases, whilst that of the other decreases.

The assembly of the calibrated tube 32 in the wall 53 of the chamber 7 is also effected as with the preceding forms of embodiment, by means of members which slide one on the other by flat surfaces and by spherical and conical surfaces. In this case however, the sleeve 34 comprises a flange 56 of cylindrical form and the ring 37 co-operates with the said flange by means of a conical surface 57. In this case also, fluid-tightness is ensured, whatever play there may exist between the various parts of the pneumatic tool.

In all the examples of construction described, the rigidity of the springs is chosen so that the operator may press down or pull to a reasonable extent on the handle without the machine coming into abutment. In addition, the stiffness or strength of the springs is chosen so that the natural frequency of the elastic system is less than the frequency of percussion of the piston of the motor mechanism on the pick.

All the preceding description may also be applied to machines such as pneumatic drills or similar devices in which the drill or other end member is subjected not only to percussion but also to a rotational force.

In these machines, the body of the motor element is subjected to a reversing torque opposite to that which causes the drill to rotate. In the usual types of pneumatic drills, this torque is balanced by the operator without any other medium than possibly a handle of rubber.

The device consisting of the key 19 and slot 20, which comprises the form of embodiment of Fig. 1, enables the application of the various special features described above to be made to drilling machines without any modification, provided that it is acceptable to transmit almost the whole of the angular vibrations to the operator. Any other device enabling the motor element and the casing to slide one with respect to the other without rotation would also be suitable.

Figure 4:
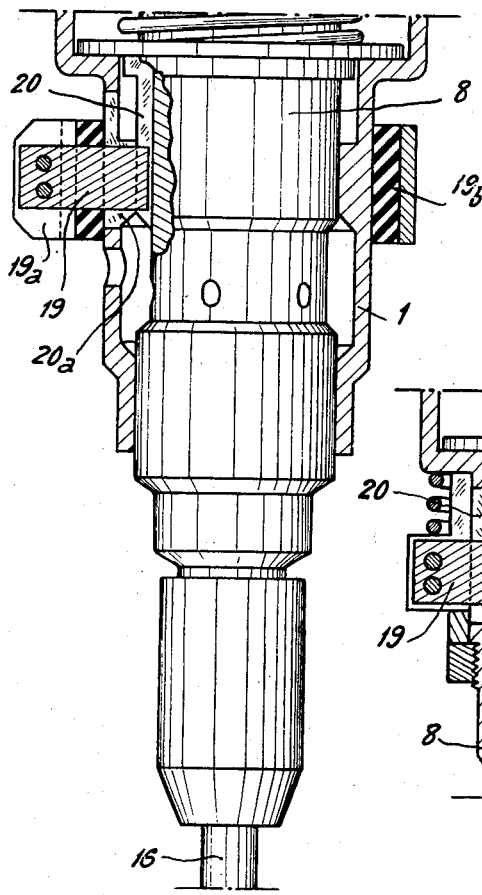
Fig. 4 is a view in elevation with a part in cross-section, of a drilling tool constructed in accordance with the invention.

It is however preferable to provide elastic means to effect the damping of the angular vibrations of the motor element with respect to the casing. In the form of embodiment of Fig. 4, the stud or key 19 which co-operates with the longitudinal slot 20 of the motor element 8 is mounted on the casing 1 through the medium of a ring 19a stuck to a rubber ring 19b which is in turn stuck to the body of the casing 1. The key 19 passes of course through the wall of the casing 1 through an opening 20a of suitable dimensions; thus, the torsional vibrations of the motor element with respect to the casing are damped and the fatigue on the operator is considerably reduced.

Figure 5:
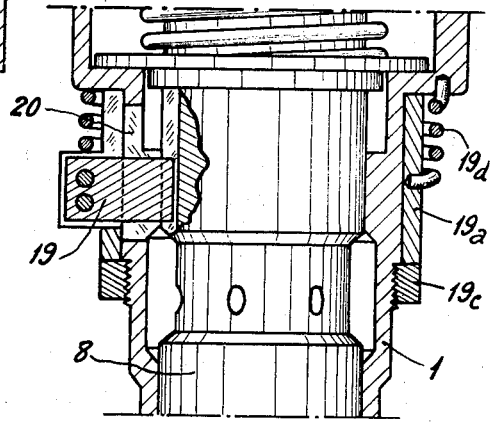
Fig. 5 is a similar view of an alternative form of construction.

In the alternative form shown in Fig. 5, the ring 19a is mounted freely on the wall 1 of the casing and is held in position by a stop ring 19c. A torsion spring 19d is fixed at one of its ends to the ring 19a and by the other to the wall 1 of the casing.

In addition, it is possible also to ensure the damping which forms the present problem by means of springs such as 23, 49, 50 and 51, of which one extremity would be suitably connected to the motor element and the other to the casing.

It will of course be understood that modifications may be made to the forms of embodiment which have been described above, in particular by the substitution of equivalent technical means, without thereby departing from the spirit or from the scope of the present invention.

What I claim is:

1. A pneumatic drilling tool comprising in combination a hollow casing element having opposing ends, one of said ends being open and grip means provided on the casing element adjacent the other end, a percussive motor element slidably mounted in the casing element for limited movement through the open end, a partition means extending across the casing element above the open end and defining a chamber above the open end, means connecting the chamber with a source of compressed air, a tube mounted on one of the elements for conducting air from the chamber to the motor element and double-acting resilient means interposed between said motor element and said casing element for biasing said motor element to a mean position with respect to said casing element.

2. The combination of claim 1 wherein said double acting resilient means are adapted to be operative for a part of the relative displacement of said elements.

3. The combination of claim 1, wherein said resilient means comprise a double acting spring mounted between slidable rings arranged between stop members on said motor element and stop members on said casing element.

4. The combination of claim 3, wherein said stop members on said motor element are spaced apart by different distances than said stop members on said casing.

5. The combination of claim 3 wherein said resilient means further comprise a single acting spring inserted between one of said rings and a stop member of one of said elements.

6. The combination of claim 1 wherein said tube is provided with an orifice at one of its ends and comprises staggered orifices in its portion adjacent said end.

7. The combination of claim 1 wherein said tube slides through said partition means by means of a sleeve, said sleeve being mounted on said partition means by means of a sealing ring, said sleeve and ring, on one hand, and said ring and partition means, on the other hand bearing on each other by means of two pairs of surfaces one of which comprises two flat surfaces and the other a spherical surface and a surface of revolution.

8. The combination of claim 7 wherein said tube is provided with an orifice at one of its ends and with orifices in the portion adjacent said end, at least one of said last named orifices being adapted to be uncovered by said sleeve when said motor element has reached the maximum extend of its stroke towards the open end of said casing.

9. The combination of claim 7 wherein said sleeve and ring are forced against said partition means by means of a spring.

10. The combination of claim 1 wherein said motor element comprises a cylinder and a reciprocating piston adapted to strike on a bit, said cylinder comprising in its inner surface a plurality of circular grooves communicating with a channel connected to said tube, said grooves being located in such a manner that they are covered by said piston when said piston strikes said bit.

11. The combination of claim 1 wherein means are provided for preventing said motor element from rotating with respect to said casing element and said last mentioned means are mounted resiliently on said element.

12. The combination of claim 1 wherein means are provided for preventing said motor element from rotating with respect to said casing element and said last mentioned means comprise at least a part of said resilient means.

References Cited in the file of this patent

UNITED STATES PATENTS

| | | |
|---|---|---|
| 1,597,245 | Prellwitz | Aug. 24, 1926 |
| 1,679,291 | Byers | July 31, 1928 |
| 2,019,964 | Hamerly | Nov. 5, 1935 |
| 2,667,144 | Evans | Jan. 26, 1954 |
| 2,706,103 | Stambaugh et al. | Apr. 12, 1955 |
| 2,762,341 | Salengro | Sept. 11, 1956 |

FOREIGN PATENTS

| | | |
|---|---|---|
| 1,059,349 | France | Mar. 24, 1954 |